(12) United States Patent
Yeh et al.

(10) Patent No.: US 11,222,545 B2
(45) Date of Patent: Jan. 11, 2022

(54) TECHNOLOGIES FOR PROVIDING SIGNAL QUALITY BASED ROUTE MANAGEMENT FOR UNMANNED AERIAL VEHICLES

(71) Applicant: Intel Corporation, Santa Clara, CA (US)

(72) Inventors: Shu-Ping Yeh, Campbell, CA (US); Jingwen Bai, San Jose, CA (US); Feng Xue, Redwood City, CA (US); Mark Davis, Carlsbad, CA (US); Shilpa Talwar, Cupertino, CA (US)

(73) Assignee: Intel Corporation, Santa Clara, CA (US)

(*) Notice: Subject to any disclaimer, the term of this patent is extended or adjusted under 35 U.S.C. 154(b) by 203 days.

(21) Appl. No.: 16/455,910

(22) Filed: Jun. 28, 2019

(65) Prior Publication Data

US 2019/0318635 A1 Oct. 17, 2019

(51) Int. Cl.
*G08G 5/00* (2006.01)
*B64C 39/02* (2006.01)
*G05D 1/00* (2006.01)
*H04B 7/185* (2006.01)

(52) U.S. Cl.
CPC ......... *G08G 5/0034* (2013.01); *B64C 39/024* (2013.01); *G08G 5/0013* (2013.01); *G08G 5/0069* (2013.01); *H04B 7/18506* (2013.01)

(58) Field of Classification Search
CPC .. G08G 5/0034; G08G 5/0013; G08G 5/0069; G08G 5/0026; G08G 5/0043; G08G 1/16; G08G 5/00; B64C 39/024; B64C 39/02; H04B 7/18506; G06Q 50/30; G06Q 10/047; H04W 12/00; H04W 12/06; H04W 12/08; G01C 21/00; G01C 21/20; G05D 1/00; H04K 3/00; H04K 3/22; H04K 3/25; H04K 3/90
See application file for complete search history.

(56) References Cited

U.S. PATENT DOCUMENTS

| | | | |
|---|---|---|---|
| 2017/0069214 A1* | 3/2017 | Dupray | G08G 5/0013 |
| 2017/0243494 A1* | 8/2017 | Taveira | G08G 5/0069 |
| 2018/0025650 A1* | 1/2018 | Taveira | B64C 39/024 |
| | | | 701/3 |
| 2018/0033244 A1* | 2/2018 | Northrup | G07F 17/3244 |
| 2019/0109632 A1* | 4/2019 | Kosseifi | H04B 7/18506 |
| 2019/0279440 A1* | 9/2019 | Ricci | H04W 4/48 |
| 2019/0302798 A1* | 10/2019 | Winkle | G01C 21/20 |

OTHER PUBLICATIONS

NASA; UTM Home website, accessed on the internet at at https://utm.arc.nasa.gov/index.shtml, site update as of Jun. 21, 2018; 2 pages.

* cited by examiner

*Primary Examiner* — Yonel Beaulieu
(74) *Attorney, Agent, or Firm* — Alliance IP, LLC (57) ABSTRACT

Technologies for providing signal quality based route management for unmanned aerial vehicles include a device that includes circuitry to produce a data set indicative of a wireless communication signal quality at each of multiple locations in a geographic area. The circuitry is also to produce, as a function of the data set and a target wireless communication signal quality, a planned route for a vehicle through the geographic area.

21 Claims, 10 Drawing Sheets

TECHNOLOGIES FOR PROVIDING SIGNAL QUALITY BASED ROUTE MANAGEMENT FOR UNMANNED AERIAL VEHICLES

BACKGROUND

Recently, there has been increasing market interest in applications that involve unmanned aerial vehicles (UAVs), also known as drones (e.g., for delivering packages, for surveying areas, etc.). However, one significant challenge to widespread commercial use of UAVs is ensuring that the operations of the UAVs are safe and reliable. In that regard, there are multiple ongoing efforts to establish traffic management frameworks for UAV operations to avoid collisions between the UAVs and other objects. Typically, it is important to maintain constant communication with UAVs to enable the UAVs to communicate with traffic management systems and to respond to emerging situations as they occur (e.g., along a route through a geographic area). However, in some instances, a UAV may travel through an area where the wireless connectivity available to a UAV is unreliable, thereby diminishing the ability of the UAV and the traffic management system to communicate.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
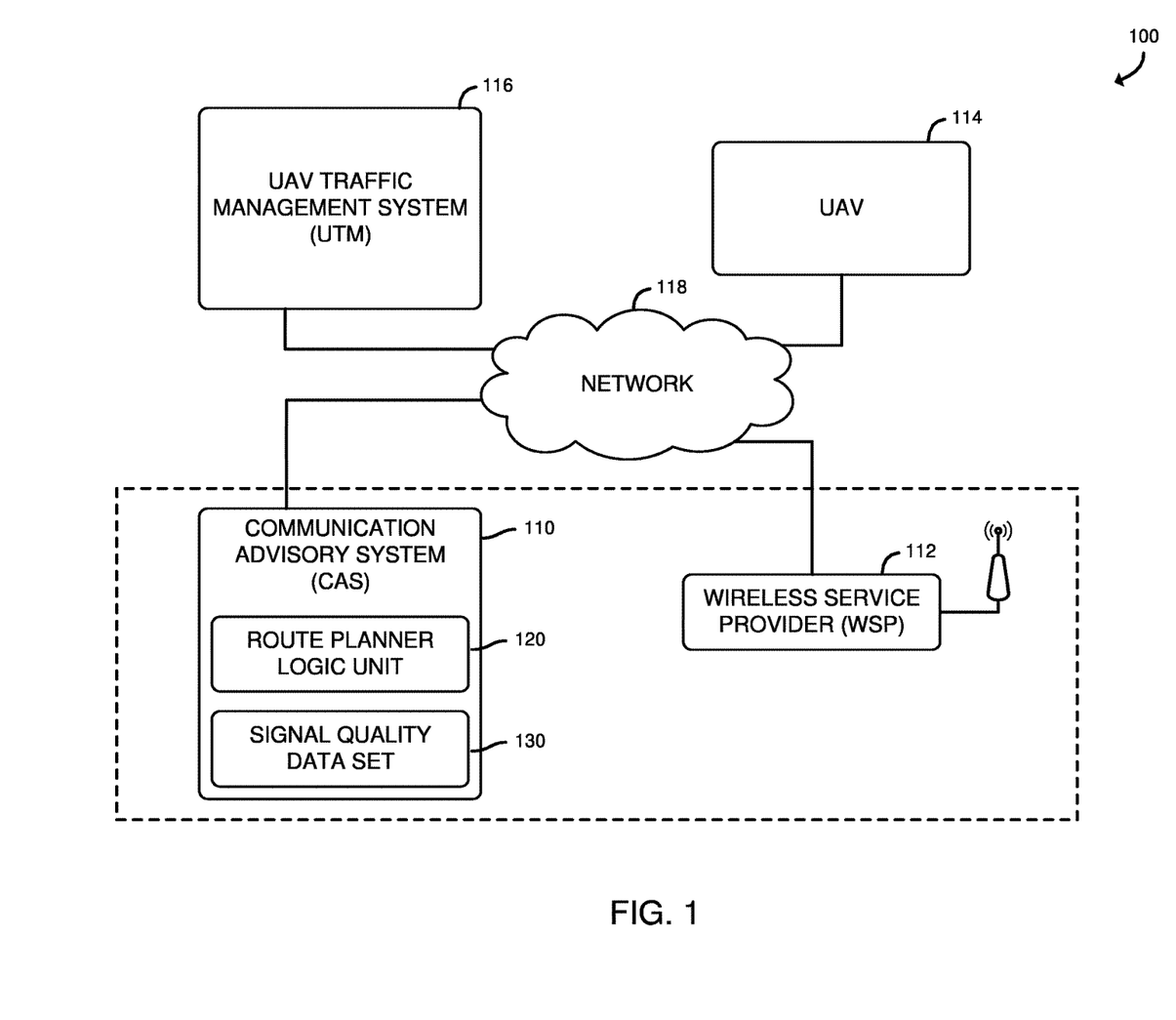
FIG. 1 is a simplified diagram of at least one embodiment of a system for providing signal quality based route management for unmanned aerial vehicles.
Figure 7:
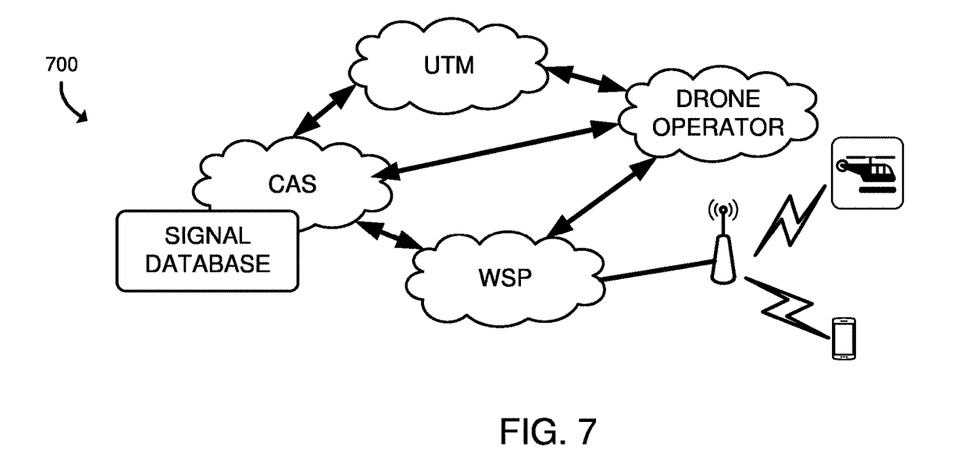
FIG. 7 is a simplified diagram of an architecture of at least one embodiment of the system of FIG. 1, in which a communication advisory system (CAS) and a wireless service provider (WSP) are separate.
Figure 8:
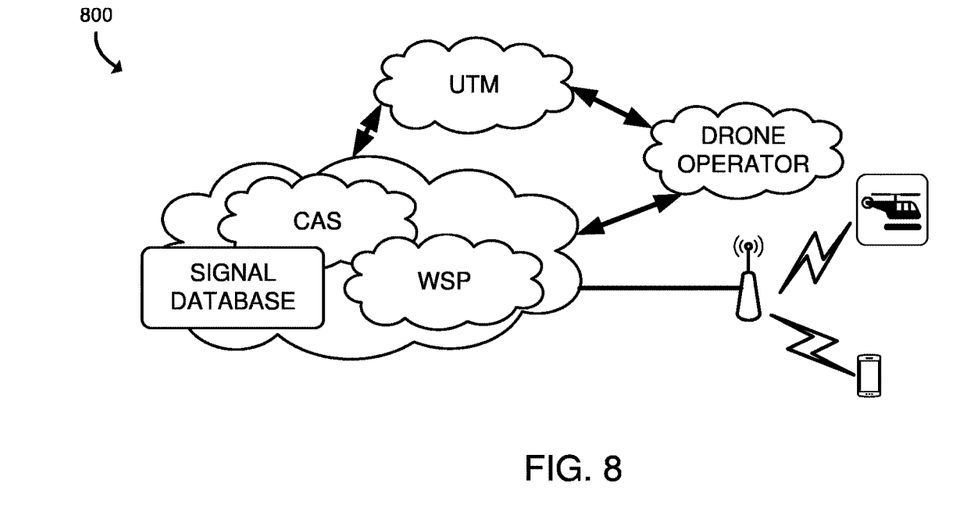
FIG. 8 is a simplified diagram of an architecture of at least one embodiment of the system of FIG. 1, in which a communication advisory system (CAS) and a wireless service provider (WSP) are combined.

Referring now to FIG. 1, a system 100 for providing signal quality based route management for unmanned aerial vehicles includes a communication advisory system (CAS) 110 in communication with a wireless service provider (WSP) 112 (e.g., an entity that owns and/or operates equipment to provide wireless communication services to users of wireless communication devices through radio frequency (RF) signals rather than through end-to-end wire communication), an unmanned aerial vehicle traffic management system (UTM) 114 (e.g., an entity that coordinates the operations of one or more unmanned aerial vehicles to avoid collisions and otherwise ensure safety), and an unmanned aerial vehicle (UAV) 116. In operation, and as described in more detail herein, the communication advisory system 110 produces a signal quality data set 130 (e.g., a database) indicative of wireless communication signal qualities at multiple locations (e.g., locations defined in three dimensions, such as latitude, longitude, and altitude) in a geographic area. The communication advisory system 110 may produce the signal quality data set by collecting location and wireless signal quality data reported by one or more UAVs (e.g., the UAV 114) and/or from one or more wireless service providers 112 (e.g., wireless communication signal quality data collected by one or more base stations of the wireless service provider 112). Further, the CAS 110 utilizes the data set to assist in planning a route for a UAV (e.g., the UAV 114) through the geographic area to reduce the likelihood that the UAV will pass through a region in which the wireless communication signal quality available to the UAV does not satisfy a target wireless communication signal quality (e.g., to ensure that the UAV is able to communicate with the UTM 116 and/or other devices along the route). In doing so, the CAS 110 may plan the route by adjusting a proposed route (e.g., received from the UTM 116) or may produce the entire route based on data indicative of locations that are to be included in the route (e.g. a starting location, a destination, one or more waypoints, etc.). Further, and as described in more detail herein, the CAS 110 may coordinate with the WSP 112 to improve the wireless communication signal quality available to the UAV 114 at one or more locations along the planned route. In doing so, in some embodiments, the CAS 110 may directly control the operations of the WSP 112 (e.g., in embodiments in which the CAS 110 is integrated into the WSP 112), such as by controlling beamforming operations to increase a signal strength provided to the UAV 114. In the illustrative embodiment, the CAS 110 includes a route planner logic unit 120 which may be embodied as any device or circuitry (e.g., a co-processor, reconfigurable circuitry, an application specific integrated circuit (ASIC), a field programmable gate array (FPGA), etc.) configured to perform the above operations (e.g., producing the data set, producing the planned route, etc.), thereby offloading the operations from a general purpose processor of the CAS 110. Referring briefly to FIG. 7, an embodiment of the system 100 has an architecture 700 in which a CAS (e.g., the CAS 110) is separate from a WSP (e.g., the WSP 112). By contrast, and referring now to FIG. 8, in some embodiments, the system 100 may have an architecture 800 in which a CAS (e.g., the CAS 110) is integrated into a WSP (e.g., the WSP 112).

Figure 2:
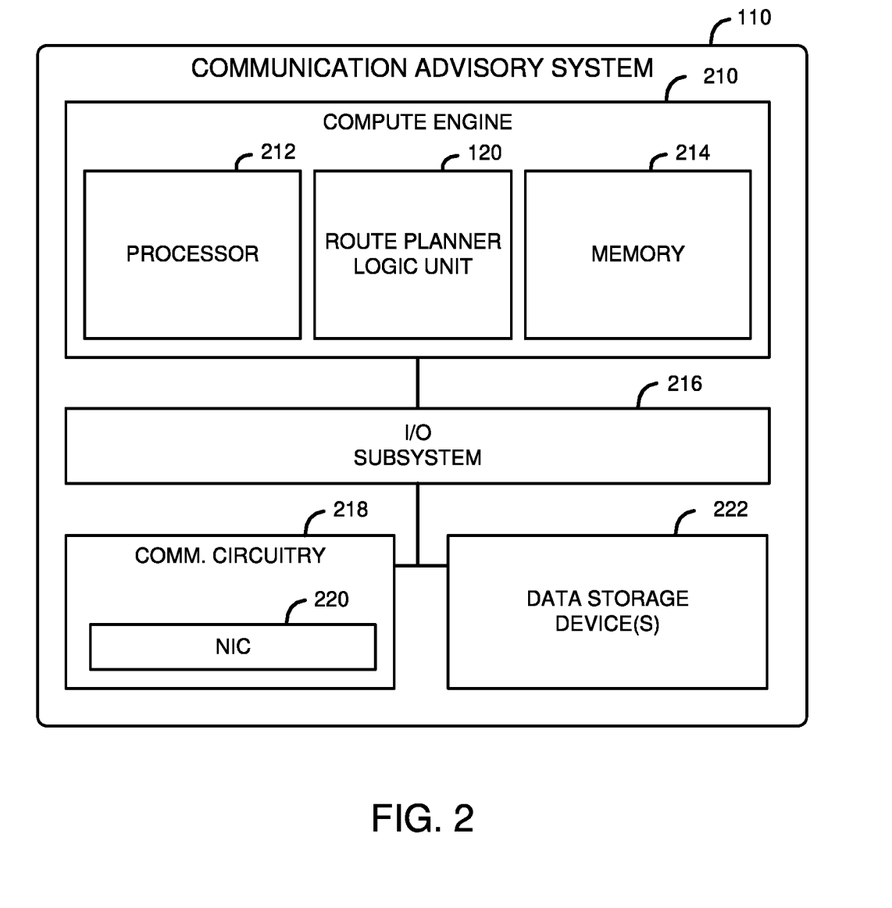
FIG. 2 is a simplified block diagram of at least one embodiment of a communication advisory system included the system of FIG. 1.

Referring now to FIG. 2, the illustrative communication advisory system (CAS) 110 may be embodied as a compute device (e.g., a computer) that includes a compute engine (also referred to herein as "compute engine circuitry") 210, an input/output (I/O) subsystem 216, communication circuitry 218, and one or more data storage devices 222. Of course, in other embodiments, the CAS 110 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212, a memory 214, and the route planner logic unit 120, described above with reference to FIG. 1. The processor 212 may be embodied as any type of processor capable of performing the functions described herein. For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as one or more applications, data operated on by the application(s) (e.g., the signal quality data set 130), libraries, and drivers.

The compute engine 210 is communicatively coupled to other components of the CAS 110 via the I/O subsystem 216, which may be embodied as circuitry and/or components to facilitate input/output operations with the compute engine 210 (e.g., with the processor 212 and/or the main memory 214) and other components of the CAS 110. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the CAS 110, into the compute engine 210.

The communication circuitry 218 may be embodied as any communication circuit, device, or collection thereof, capable of enabling communications over a network between the CAS 110 and another compute device (e.g., the UAV 114, the UTM 116, the WSP 112, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (NIC) 220. The NIC 220 may be embodied as one or more add-in-boards, daughter cards, network interface cards, controller chips, chipsets, or other devices that may be used by the CAS 110 to connect with another compute device (e.g., the UAV 114, the UTM 116, the WSP 112, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the CAS 110 at the board level, socket level, chip level, and/or other levels.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

The WSP 112, the UAV 114, and the UTM 116 may have components similar to those described in FIG. 2 with reference to the CAS 110. The description of those components of the CAS 110 is equally applicable to the description of components of the WSP 112, the UAV 114, and the UTM 116, with the exception that, in some embodiments, the route planner logic unit 120 is not included in devices other than the CAS 110. Further, it should be appreciated that any of the CAS 110, WSP 112, the UAV 114, and the UTM 116 may include other components, sub-components, and devices commonly found in a computing device, which are not discussed above in reference to the CAS 110 and not discussed herein for clarity of the description. Further, it should be understood that one or more components of a compute device may be distributed across any distance, and are not necessarily housed in the same physical unit.

Referring back to FIG. 1, the CAS 110, the WSP 112, the UAV 114, and the UTM 116 are illustratively in communication via a network 118, which may be embodied as any type of data communication network, including cellular networks (e.g., Global System for Mobile Communications (GSM), 3G, Long Term Evolution (LTE), Worldwide Interoperability for Microwave Access (WiMAX), etc.), a radio access network (RAN), an edge network, a fog network, global networks (e.g., the Internet), local area networks (LANs) or wide area networks (WANs), digital subscriber line (DSL) networks, cable networks (e.g., coaxial networks, fiber networks, etc.), or any combination thereof.

Figure 3:
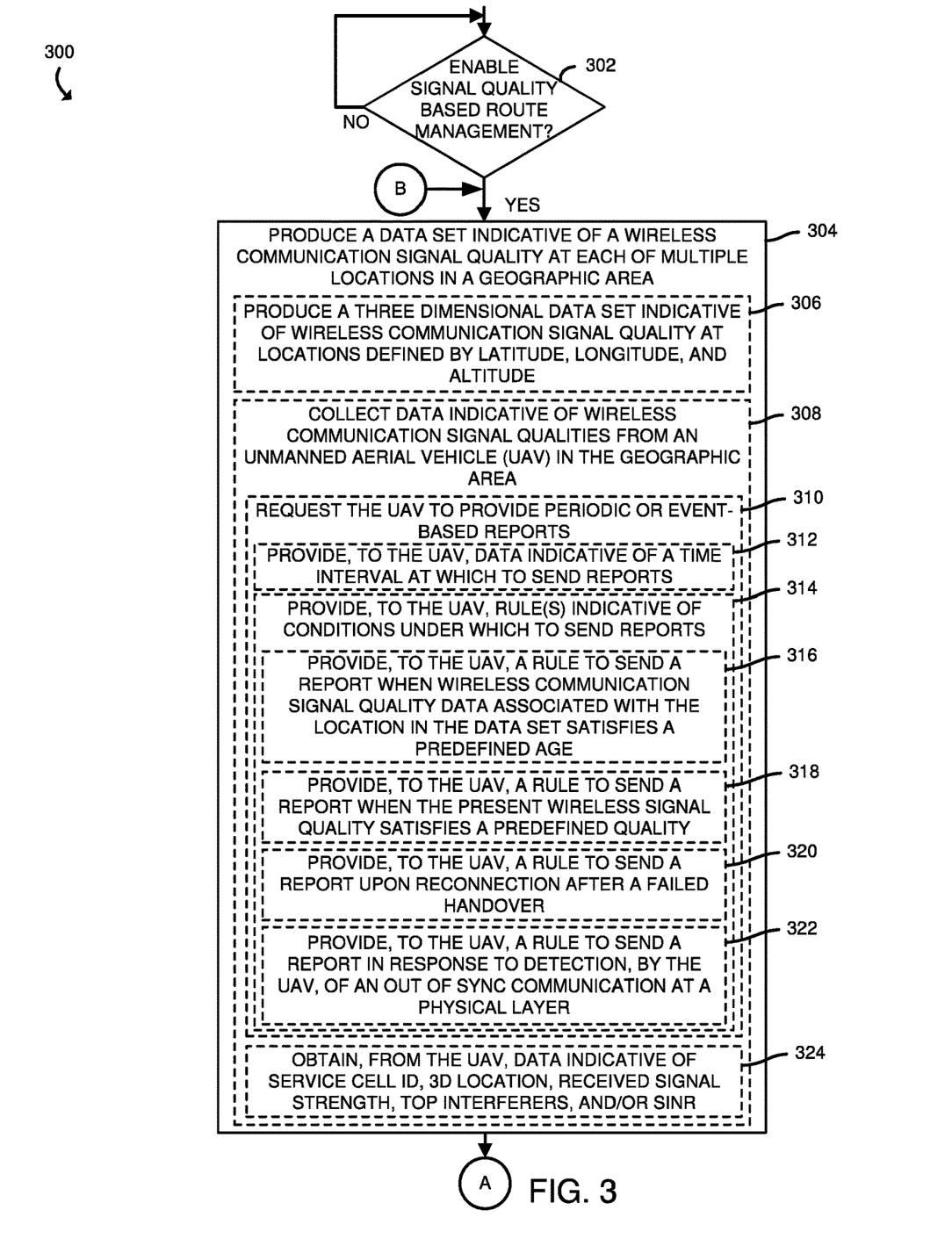
FIGS. 3-6 are simplified block diagrams of at least one embodiment of a method that may be performed by a communication advisory system of FIG. 1 for providing signal quality based route management for unmanned aerial vehicles.

Referring now to FIG. 3, the CAS 110, in operation, may execute a method 300 for providing signal quality based route management for unmanned aerial vehicles. The method 300 begins with block 302, in which the CAS 110 determines whether to enable signal quality based route management. The CAS 110 may determine to enable signal quality based route management in response to a determination that the CAS 110 is equipped with the route planner logic unit 120, in response to a determination that a configuration setting (e.g., in the memory 214) indicates to enable signal quality based route management, and/or based on other factors. Regardless, in response to a determination to enable signal quality based route management, the method 300 advances to block 304, in which the CAS 110 produces a data set (e.g., the signal quality data set 130) indicative of a wireless communication signal quality at each of multiple locations in a geographic area. In doing so and as indicated in block 306, the CAS 110 may produce a three dimensional data set indicative of the wireless communication signal quality at each of multiple locations that are defined by three spatial dimensions, such as latitude, longitude, and altitude. In producing the data set, and as indicated in block 308, the CAS 110 may collect data indicative of the wireless communication signal qualities from an unmanned aerial vehicle (UAV) in the geographic area. For example, and as indicated in block 310, the CAS 110 may request the UAV to provide periodic or event-based reports indicative of the signal quality. In doing so, the CAS 110 may provide, to the UAV, data indicative of a time interval at which to send reports (e.g., every second, every 10 seconds, every minute, etc.), as indicated in block 312. Additionally or alternatively, and as indicated in block 314, the CAS 110 may provide, to the UAV, one or more rules indicative of conditions under which to send reports of signal quality (e.g., when the condition(s) are satisfied). For example, and as indicated in block 316, the CAS 110 may provide, to the UAV, data indicative of a rule to send a report when the wireless communication signal quality data (e.g., in the signal quality data set 130) associated with the present location of the UAV satisfies a predefined age (e.g., is older than one day). Additionally or alternatively, and as indicated in block 318, the CAS 110 may provide, to the UAV, data indicative of a rule to send a report when the present wireless communication signal quality (e.g., the wireless communication signal quality at the present location of the UAV) satisfies a predefined quality (e.g., is less than a minimum acceptable quality).

As indicated in block 320, the CAS 110 may provide, to the UAV, data indicative of a rule to send a report (e.g., of the present wireless communication signal quality) upon reconnection after a failed handover (e.g., a process in which a connected data session is transferred from one cell site (base station) to another without disconnecting the session). Additionally or alternatively, and as indicated in block 322, the CAS 110 may provide, to the UAV, data indicative of a rule to send a report in response to a detection, by the UAV, of an out of sync communication at a physical layer of a protocol stack. The CAS 110 can provide not only rules for sending the reports but also rules for when to log and what to log in the report. A proper rule can improve the memory usage. For example, the CAS 110 may instruct the UAV to log OUT-of-SYNC events and the corresponding time stamp, location, etc. The report may then be combined with other measurements to be sent later. The UAV should not send a report when it is experiencing OUT-of-SYNC, as the transmission will be very likely to fail. As indicated in block 324, in collecting data from the UAV, the CAS 110 may collect data indicative of a service cell identifier, the present location of the UAV in three spatial dimensions, the received wireless communication signal strength, a list of top interferers (e.g., one or more devices causing a predefined amount of interference with the wireless communication signal utilized by the UAV), and/or data indicative of a present signal-to-interference-plus-noise ratio (SINR) (e.g., the power of a certain signal of interest divided by the sum of the interference power from all the other interfering signals and the power of a background noise).

Figure 4:
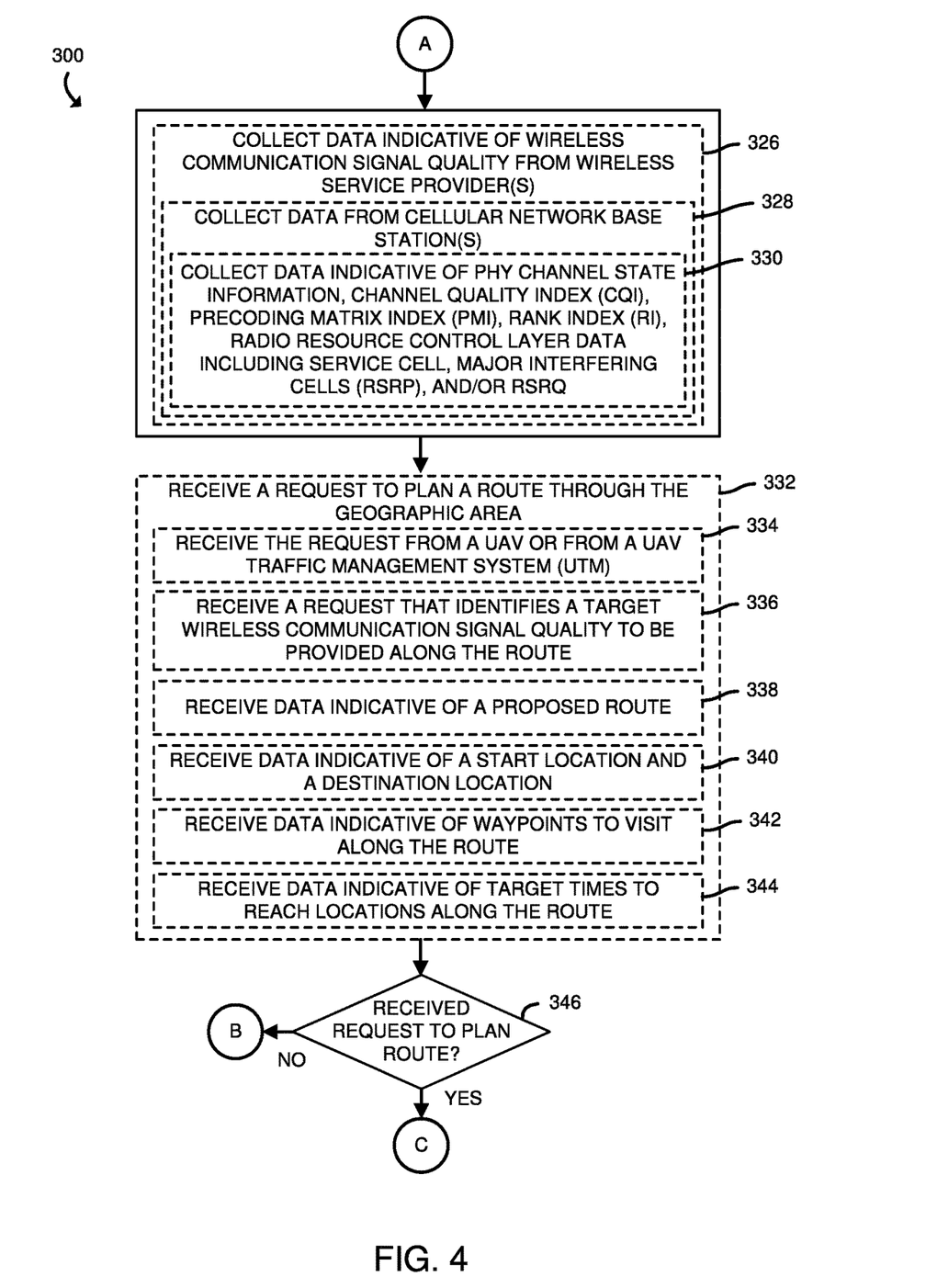
Figure 9:
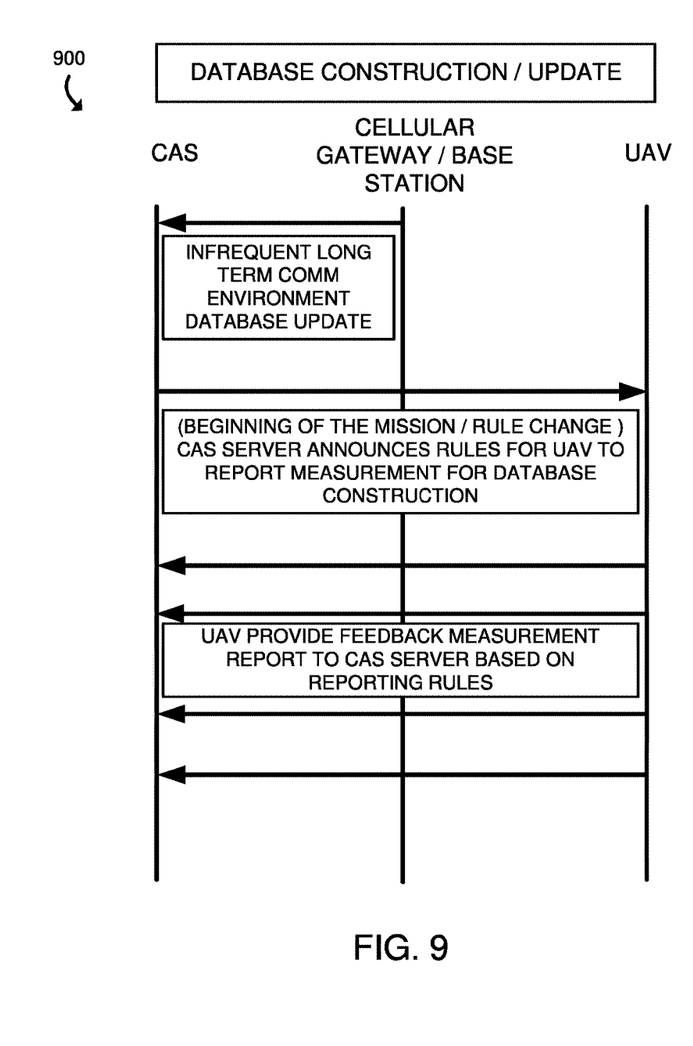
FIG. 9 is a simplified diagram of at least one embodiment of data flows for the production and update of a signal quality data set that may be performed by an embodiment of the system of FIG. 1 having the architecture of FIG. 7.
Figure 10:
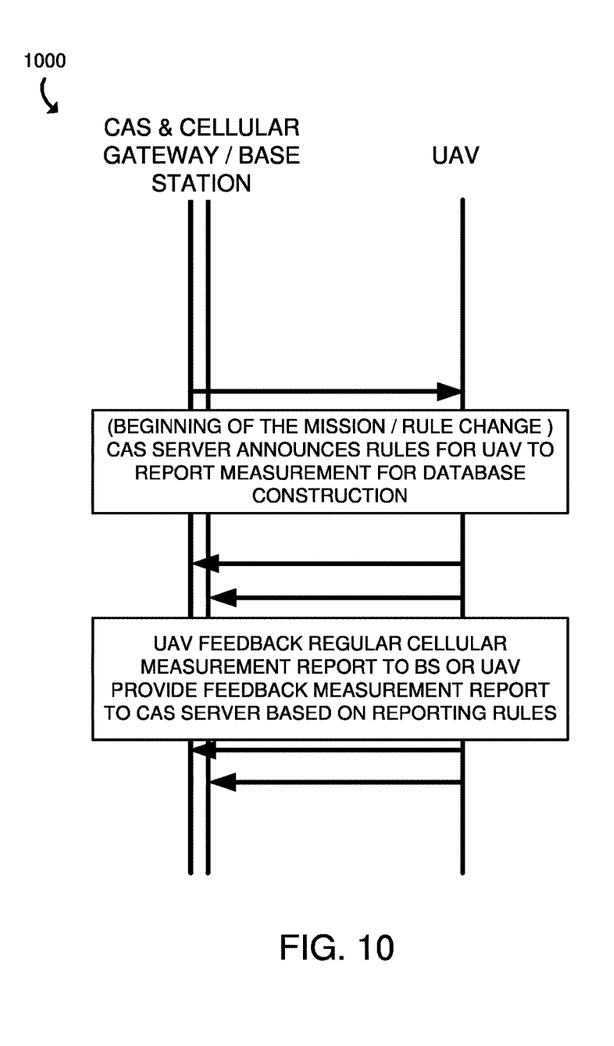
FIG. 10 is a simplified diagram of at least one embodiment of data flows for the production and update of a signal quality data set that may be performed by an embodiment of the system of FIG. 1 having the architecture of FIG. 8.

Referring now to FIG. 4, while still in the process of producing the data set indicative of a wireless communication signal quality at each of multiple locations in a geographic area (e.g., the signal quality data set 130), the CAS 110 may additionally or alternatively collect data indicative of wireless communication signal quality from one or more wireless service providers (e.g., the WSP 112), as indicated in block 326. In doing so, and as indicated in block 328, the CAS 110 may collect data from one or more cellular network base stations (e.g., each embodied as a facility located at the center of any of the cells of a cellular network). As indicated in block 330, in collecting the data, the CAS 110 may collect data indicative of PHY channel state information, channel quality index (CQI) data, precoding matrix index (PMI) data, rank index (RI) data, radio resource control layer data including service cell and major interfering cells (reference signal received power (RSRP)) (e.g., the average power received from a single reference signal), and/or reference signal received quality (RSRQ) data (e.g., quality of the received signal). Referring briefly to FIG. 9, in embodiments in which the system 100 has the architecture 700 of FIG. 7, the production and update of the data set may utilize the data flow 900. By contrast, and referring now to FIG. 10, in embodiments in which the system 100 has the architecture 800 of FIG. 8, the production and update of the data set may utilize the data flow 1000.

In block 332, the CAS 110 may receive a request to plan a route (e.g., for a UAV) through the geographic area (e.g., the geographic area represented in the signal quality data set 130). For example, and as indicated in block 334, the CAS 110 may receive the request from a UAV traffic management system (UTM), such as the UTM 116. As indicated in block 336, the CAS 110 may receive a request that identifies a target wireless communication signal quality to be provided along the route (e.g., a signal strength in decibels, an SINR, a throughput, etc.). As indicated in block 338, the CAS 110 may also receive data indicative of a proposed route through the geographic area. As indicated in block 340, the CAS 110 may receive data indicative of a start location and a destination location for the route. Further, and as indicated in block 342, the CAS 110 may receive data indicative of one or more waypoints (e.g., locations) to visit along the route. Additionally, the CAS 110 may receive data indicative of target times at which to reach the locations along the route, as indicated in block 344. In some embodiments, the request may identify certain of the locations or target times as being required and others (e.g., certain waypoints or target times for reaching the waypoints) as not being required. As indicated in block 346, the CAS 110 determines the subsequent course of action as a function of whether the CAS 110 received a request to plan a route. If a request was not received, the method 300 loops back to block 304 of FIG. 3, in which the CAS 110 continues to produce or update the data set of wireless communication signal qualities (e.g., the signal quality data set 130). Otherwise, the method 300 advances to block 348 of FIG. 5, in which the CAS 110 produces, as a function of the target wireless communication signal quality (e.g., from the request) and the data set of wireless communication signal qualities (e.g., the signal quality data set 130), a planned route through the geographic area.

Figure 5:
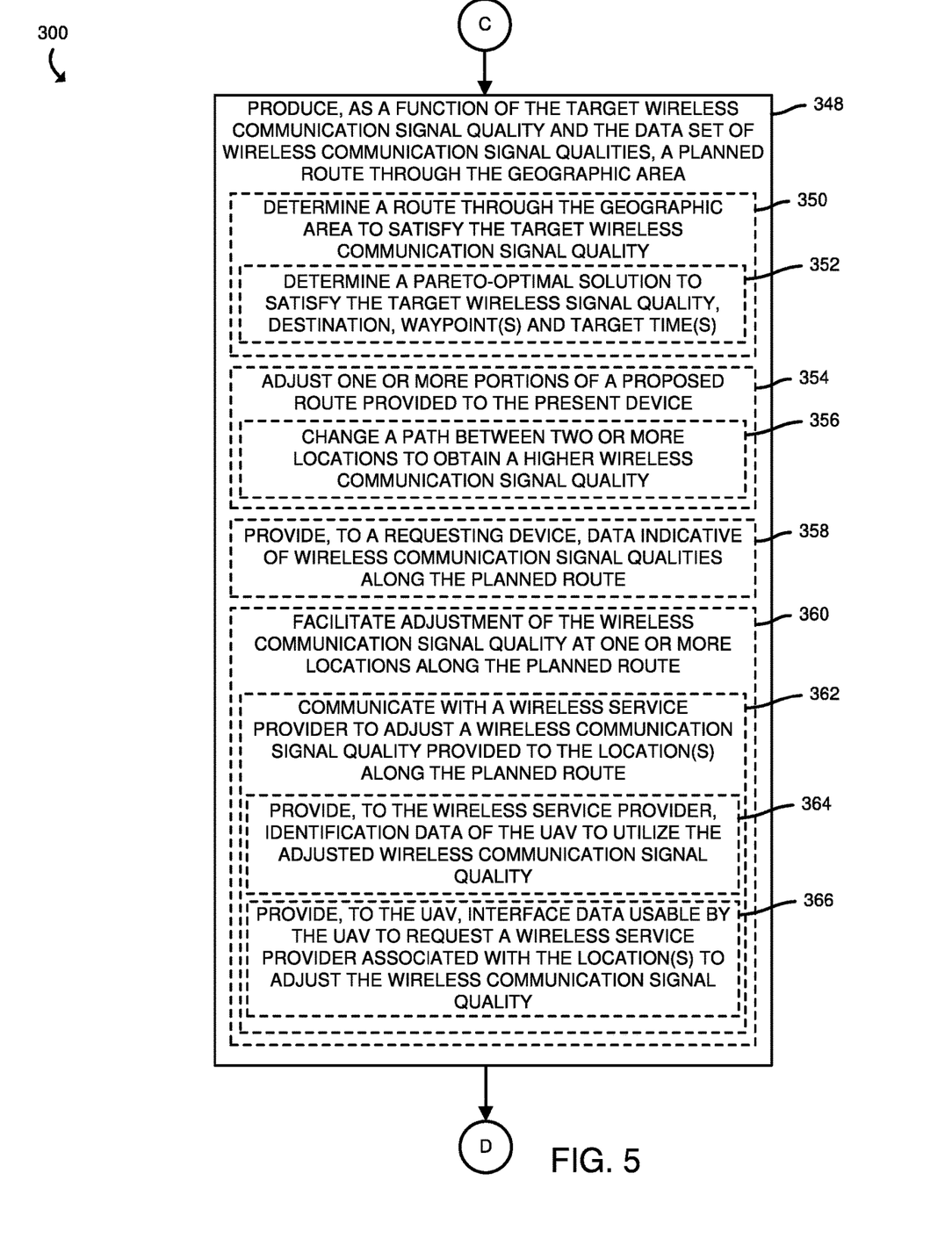
Figure 11:
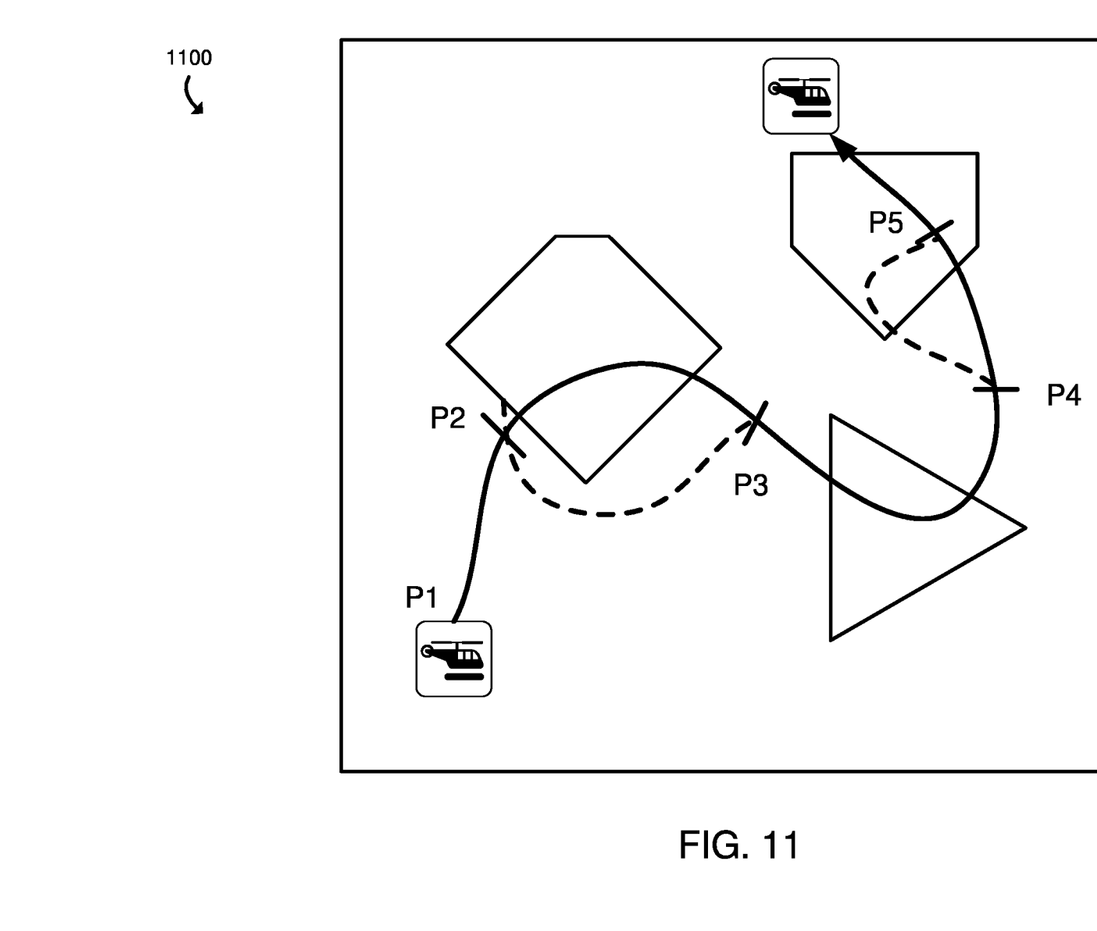
FIG. 11 is a simplified diagram of a proposed route through a geographic area and a planned route that includes adjustments to the proposed route that may be produced by the system of FIG. 1.

Referring now to FIG. 5, in producing the planned route, the CAS 110, in the illustrative embodiment, determines a route through the geographic area to satisfy the target wireless communication signal quality (e.g., defined in the request), as indicated in block 350. As indicated in block 352, the CAS 110 may determine a Pareto-optimal solution (e.g., a state of allocation of resources from which it is impossible to reallocate so as to make any one individual or preference criterion better off without making at least one individual or preference criterion worse off) to satisfy the target wireless signal quality, the destination, the waypoint(s), and the target times for reaching the locations (e.g., the destination and the waypoint(s)). The CAS 110 may adjust one or more portions of a proposed route (e.g., received in block 338) provided to the CAS 110, as indicated in block 354. For example, and as indicated in block 356, the CAS 110 may change a path between two or more locations along the proposed route to obtain a higher wireless communication signal quality than would otherwise be available to the UAV. Referring briefly to FIG. 11, the CAS 110 may modify a proposed path (e.g., indicated by a solid trace) that includes a starting location P1, a destination location, and waypoints P2, P3, P4, and P5, by adjusting two portions (e.g., indicated by the dotted traces) to maintain a target wireless communication signal quality as the UAV travels through the geographic area 1100.

As indicated in block 358, the CAS 110 may provide, to a requesting device (e.g., to the UTM 116), data indicative of wireless communication signal qualities along the planned route. In addition to assisting in planning the route that a UAV (e.g., the UAV 114) may take through the geographic region, the CAS 110 may also perform one or more operations to improve the wireless communication signal quality available to the UAV (e.g., if one of the locations (e.g., a waypoint or destination) must be visited and the wireless communication signal quality at that location does not meet the target wireless communication signal quality). Accordingly, and as indicated in block 360 of the method 300, the CAS 110 may facilitate adjustment of the wireless communication signal quality at one or more locations along the panned route. In doing so, and as indicated in block 362, the CAS 110 may communicate with a wireless service provider (e.g., the WSP 112) to adjust a wireless communication signal quality provided to the location(s) along the planned route. For example, and as indicated in block 364, the CAS 110 may provide, to the wireless service provider (e.g., the WSP 112), identification data of the UAV (e.g., the UAV 114) that will utilize the adjusted wireless communication quality (e.g., for billing purposes, to allocate resources to communication traffic originating from or directed to the UAV 114, etc.). As indicated in block 366, the CAS 110 may provide, to the UAV, interface data (e.g., data indicative of an application programming interface (API)) usable by the UAV to request a wireless service provider (e.g., the WSP 112) associated with the location(s) to adjust the wireless communication signal quality (e.g., rather than the CAS 110 sending such requests to the WSP 112).

Figure 6:
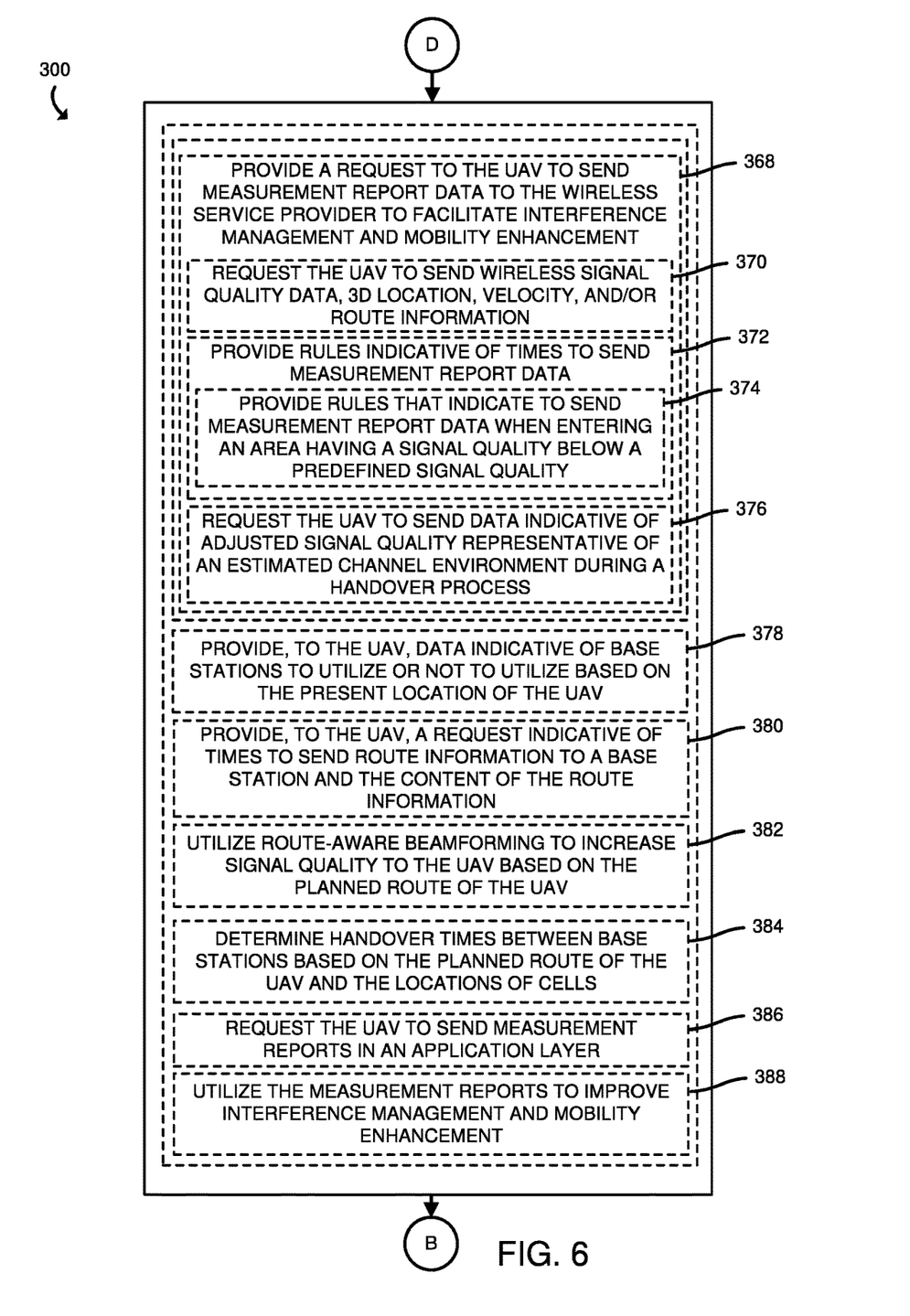

Referring now to FIG. 6, and as indicated in block 368, the CAS 110 may provide a request to the UAV to send measurement report data to the wireless service provider (e.g., the WSP 112) to facilitate interference management and mobility enhancement. For example, and as indicated in block 370, the CAS 110 may request the UAV to send data indicative of wireless signal quality, the location of the UAV in three spatial dimensions, the velocity (e.g., speed and direction) of the UAV, and/or route information (e.g., the planned route of the UAV), to the WSP 112. As indicated in block 372, the CAS 110 may provide rules indicative of times to send measurement report data. For example, and as indicated in block 374, the CAS 110 may provide rules that indicate to send measurement report data when the UAV is entering an area having a wireless communication signal quality below a predefined wireless communication signal quality. As indicated in block 376, the CAS 110 may request the UAV to send data indicative of an adjusted signal quality representative of an estimated channel environment during a handover process.

Figure 12:
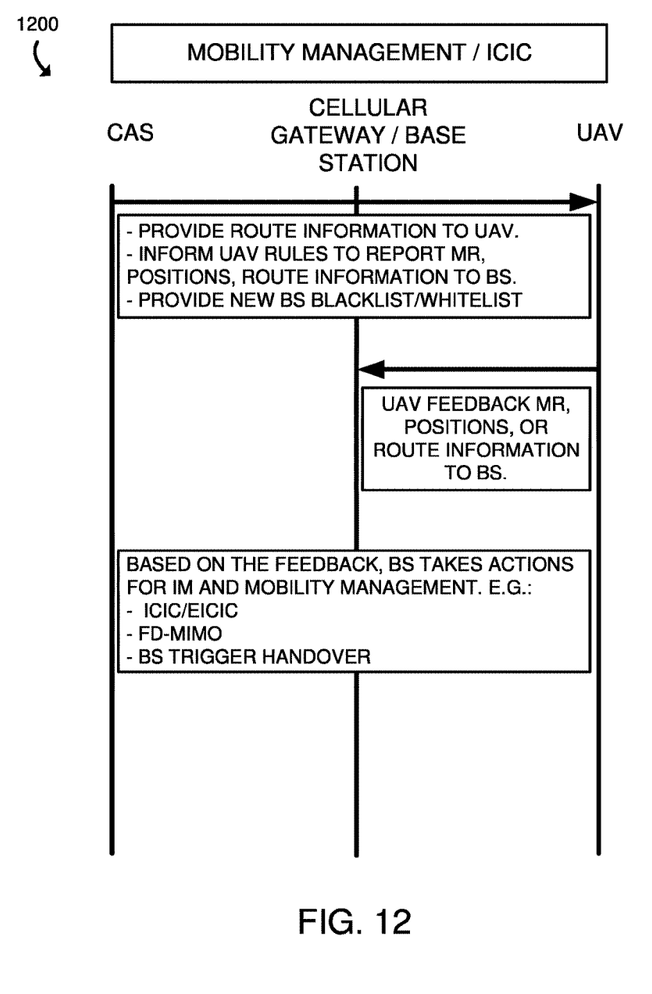
FIG. 12 is simplified diagram of at least one embodiment of data flows for triggering interference mitigation and mobility management that may be performed by an embodiment of the system of FIG. 1 having the architecture of FIG. 7.
Figure 13:
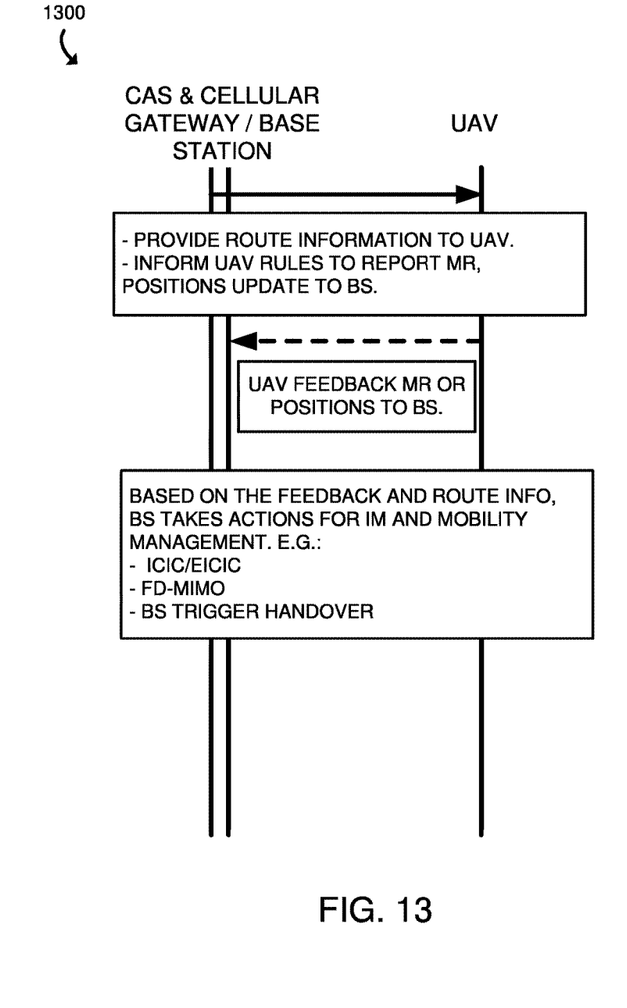
FIG. 13 is simplified diagram of at least one embodiment of data flows for triggering interference mitigation and mobility management that may be performed by an embodiment of the system of FIG. 1 having the architecture of FIG. 8.

Still referring to FIG. 6, the CAS 110 may provide, to the UAV, data indicative of base stations to utilize (e.g., a whitelist) or not to utilize (e.g., a black list) based on the present location of the UAV (e.g., utilize base station A when at location 1, utilize base station B when at location 2, etc.), as indicated in block 378. As indicated in block 380, the CAS 110 may provide, to the UAV, a request indicative of times to send route information to a base station, as well as the content to be included in the route information. In some embodiments (e.g., in embodiments in which the CAS 110 is integrated into the WSP 112), the CAS 110 may utilize route-aware beamforming (e.g., adjusting the formation of an RF field to be directed at the location of the UAV) to increase wireless communication signal quality to the UAV (e.g., based on the planned route of the UAV), as indicated in block 382. As indicated in block 384, the CAS 110 may determine handover times (e.g., when handovers should be performed) between base stations based on the planned route of the UAV and the locations of cells in the cellular network. In some embodiments, and as indicated in block 386, the CAS 110 may request the UAV to send measurement reports to the CAS 110 (e.g., in an application layer of a protocol stack) and, in block 388, the CAS 110 may utilize the received measurement reports to improve interference management and mobility enhancement (e.g., to adjust a beamforming operation based on the received measurement report, etc.). Subsequently, the method 300, loops back to block 304, in which the CAS 110 continues to update the data set (e.g., the signal quality data set 130). While the operations of the method 300 are shown in a particular order in FIGS. 3-6, it should be understood that, in some embodiments, the operations could be performed in a different order or concurrently (e.g., continually updating the signal quality data set 130 while concurrently planning routes for UAVs). Referring briefly to FIG. 12, in embodiments in which the system 100 has the architecture 700 of FIG. 7, the system 100 may utilize the data flow 1200 to perform interference management and mobility enhancement. By contrast, and referring now to FIG. 13, in embodiments in which the system 100 has the architecture 800 of FIG. 8, the system 100 may utilize the data flow 1300 to perform interference management and mobility enhancement.

EXAMPLES

Illustrative examples of the technologies disclosed herein are provided below. An embodiment of the technologies may include any one or more, and any combination of, the examples described below.

Example 1 includes a device comprising circuitry to produce a data set indicative of a wireless communication signal quality at each of multiple locations in a geographic area; and produce, as a function of the data set and a target wireless communication signal quality, a planned route for a vehicle through the geographic area.

Example 2 includes the subject matter of Example 1, and wherein to produce the data set indicative of a wireless communication signal quality at each of multiple locations comprises to produce a data set indicative of wireless communication signal quality at each of multiple locations that are each defined by three spatial dimensions.

Example 3 includes the subject matter of any of Examples 1 and 2, and wherein the circuitry is further to receive a request to plan a route and to produce the planned route in response to the request.

Example 4 includes the subject matter of any of Examples 1-3, and wherein to produce a planned route for a vehicle comprises to produce a planned route for an unmanned aerial vehicle (UAV).

Example 5 includes the subject matter of any of Examples 1-4, and wherein to produce the data set comprises to collect data indicative of wireless communication signal qualities from an unmanned aerial vehicle (UAV) in the geographic area.

Example 6 includes the subject matter of any of Examples 1-5, and wherein to produce the data set comprises to collect, from an unmanned aerial vehicle (UAV), data indicative of a service cell identifier, a three dimensional position of the UAV, a received signal strength, an identifier of a device that causes interference with a received wireless communication signal, or a signal to interference plus noise ratio.

Example 7 includes the subject matter of any of Examples 1-6, and wherein the circuitry is further to receive a request to produce the planned route, wherein the request includes a proposed route, and to produce the planned route comprises to adjust one or more portions of the proposed route to satisfy the target wireless communication signal quality.

Example 8 includes the subject matter of any of Examples 1-7, and wherein the circuitry is further to facilitate adjustment of the wireless communication signal quality at one or more locations along the planned route.

Example 9 includes the subject matter of any of Examples 1-8, and wherein the circuitry is further to communicate with a wireless service provider to adjust a wireless communication signal quality provided to one or more locations along the planned route.

Example 10 includes the subject matter of any of Examples 1-9, and wherein the circuitry is further to provide, to the vehicle, interface data that is usable by the vehicle to request a wireless service provider associated with one or more of the locations to adjust a wireless communication signal quality.

Example 11 includes the subject matter of any of Examples 1-10, and wherein the circuitry is further to provide, to the vehicle, data indicative of one or more base stations to not utilize along the planned route.

Example 12 includes the subject matter of any of Examples 1-11, and wherein the circuitry is further to adjust a beamforming operation to increase a wireless communication signal quality to the vehicle at one or more locations along the planned route.

Example 13 includes the subject matter of any of Examples 1-12, and wherein the circuitry is further to request the vehicle to provide periodic or event-based reports indicative of wireless communication signal qualities in the geographic area.

Example 14 includes the subject matter of any of Examples 1-13, and wherein the circuitry is further to provide, to the vehicle, a rule indicative of one or more conditions under which to send reports.

Example 15 includes one or more machine-readable storage media comprising a plurality of instructions stored thereon that, in response to being executed, cause a device to produce a data set indicative of a wireless communication signal quality at each of multiple locations in a geographic area; and produce, as a function of the data set and a target wireless communication signal quality, a planned route for a vehicle through the geographic area.

Example 16 includes the subject matter of Example 15, and wherein to produce the data set indicative of a wireless communication signal quality at each of multiple locations comprises to produce a data set indicative of wireless communication signal quality at each of multiple locations that are each defined by three spatial dimensions.

Example 17 includes the subject matter of any of Examples 15 and 16, and wherein the plurality of instructions further cause the device to receive a request to plan a route and to produce the planned route in response to the request.

Example 18 includes the subject matter of any of Examples 15-17, and wherein to produce a planned route for a vehicle comprises to produce a planned route for an unmanned aerial vehicle (UAV).

Example 19 includes a method comprising producing, by a device, a data set indicative of a wireless communication signal quality at each of multiple locations in a geographic area; and producing, by the device and as a function of the data set and a target wireless communication signal quality, a planned route for a vehicle through the geographic area.

Example 20 includes the subject matter of Example 19, and wherein producing the data set indicative of a wireless communication signal quality at each of multiple locations comprises producing a data set indicative of wireless communication signal quality at each of multiple locations that are each defined by three spatial dimensions.

What is claimed is:

1. A device comprising:
   circuitry to:
      produce a data set indicative of a wireless communication signal quality at each of multiple locations in a geographic area; and
      produce, as a function of the data set and a target wireless communication signal quality, a planned route for a vehicle through the geographic area, the planned route to reduce the likelihood that the vehicle will pass through a region in which the wireless communication signal quality is lower than the target wireless communication signal quality.

2. The device of claim 1, wherein to produce the data set indicative of a wireless communication signal quality at each of multiple locations comprises to produce a data set indicative of wireless communication signal quality at each of multiple locations that are each defined by three spatial dimensions.

3. The device of claim 1, wherein the circuitry is further to receive a request to plan a route, produce the planned route in response to the request, and provide the planned route for transmission over a wireless network to the vehicle.

4. The device of claim 1, wherein to produce a planned route for a vehicle comprises to produce a planned route for an unmanned aerial vehicle (UAV).

5. The device of claim 1, wherein to produce the data set comprises to collect data indicative of wireless communication signal qualities from an unmanned aerial vehicle (UAV) in the geographic area.

6. The device of claim 1, wherein to produce the data set comprises to collect, from an unmanned aerial vehicle (UAV), data indicative of a service cell identifier, a three dimensional position of the UAV, a received signal strength, an identifier of a device that causes interference with a received wireless communication signal, or a signal to interference plus noise ratio.

7. The device of claim 1, wherein the circuitry is further to receive a request to produce the planned route, wherein the request includes a proposed route, and to produce the planned route comprises to adjust one or more portions of the proposed route to satisfy the target wireless communication signal quality.

8. The device of claim 1, wherein the circuitry is further to facilitate adjustment of the wireless communication signal quality at one or more locations along the planned route.

9. The device of claim 8, wherein the circuitry is further to communicate with a wireless service provider to adjust a wireless communication signal quality provided to one or more locations along the planned route.

10. The device of claim 8, wherein the circuitry is further to provide, to the vehicle, interface data that is usable by the vehicle to request a wireless service provider associated with one or more of the locations to adjust a wireless communication signal quality.

11. The device of claim 1, wherein the circuitry is further to provide, to the vehicle, data indicative of one or more base stations to not utilize along the planned route.

12. The device of claim 1, wherein the circuitry is further to adjust a beamforming operation to increase a wireless communication signal quality to the vehicle at one or more locations along the planned route.

13. The device of claim 1, wherein the circuitry is further to request the vehicle to provide periodic or event-based reports indicative of wireless communication signal qualities in the geographic area.

14. The device of claim 13, wherein the circuitry is further to provide, to the vehicle, a rule indicative of one or more conditions under which to send reports.

15. One or more machine-readable storage media comprising a plurality of instructions stored thereon that, in response to being executed, cause a device to:
    produce a data set indicative of a wireless communication signal quality at each of multiple locations in a geographic area; and
    produce, as a function of the data set and a target wireless communication signal quality, a planned route for a vehicle through the geographic area, the planned route to reduce the likelihood that the vehicle will pass through a region in which the wireless communication signal quality is lower than the target wireless communication signal quality.

16. The one or more machine-readable storage media of claim 15, wherein to produce the data set indicative of a wireless communication signal quality at each of multiple locations comprises to produce a data set indicative of wireless communication signal quality at each of multiple locations that are each defined by three spatial dimensions.

17. The one or more machine-readable storage media of claim 15, wherein the plurality of instructions further cause the device to receive a request to plan a route and to produce the planned route in response to the request.

18. The one or more machine-readable storage media of claim 15, wherein to produce a planned route for a vehicle comprises to produce a planned route for an unmanned aerial vehicle (UAV).

19. A method comprising:
    producing, by a device, a data set indicative of a wireless communication signal quality at each of multiple locations in a geographic area; and
    producing, by the device and as a function of the data set and a target wireless communication signal quality, a planned route for a vehicle through the geographic area, the planned route to reduce the likelihood that the vehicle will pass through a region in which the wireless communication signal quality is lower than the target wireless communication signal quality.

20. The method of claim 19, wherein producing the data set indicative of a wireless communication signal quality at each of multiple locations comprises producing a data set indicative of wireless communication signal quality at each of multiple locations that are each defined by three spatial dimensions.

21. The device of claim 1, wherein the device is to communicate the planned route to the vehicle through a base station of a wireless service provider.

\* \* \* \* \*